Figure 1:
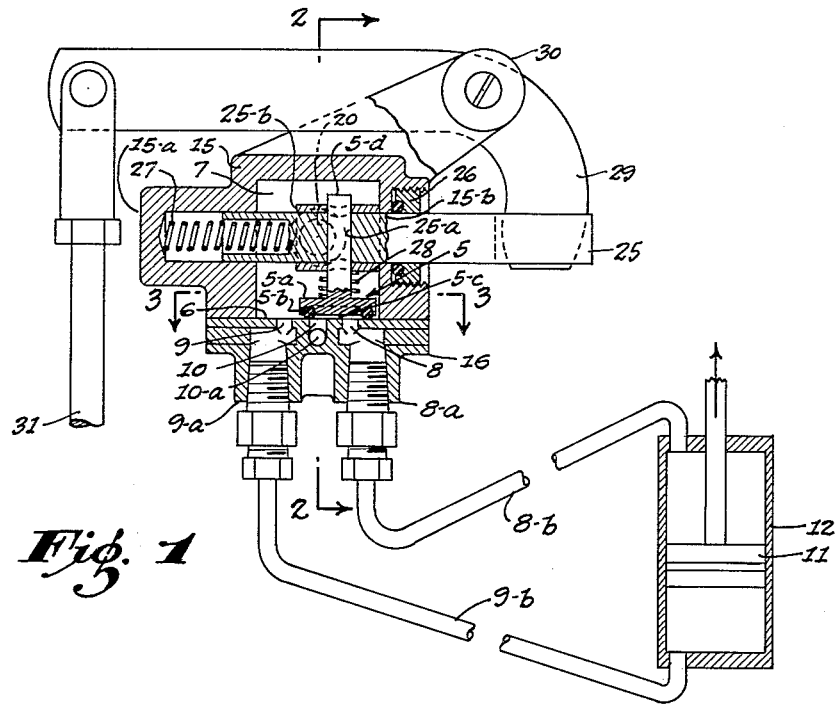

Aug. 23, 1955     J. L. TAYLOR     2,715,913

CONTROL VALVE

Filed June 30, 1945

INVENTOR
John L. Taylor
BY John Flam
ATTORNEY

United States Patent Office 2,715,913
Patented Aug. 23, 1955

2,715,913

CONTROL VALVE

John L. Taylor, La Habra Heights, Calif.

Application June 30, 1945, Serial No. 602,593

3 Claims. (Cl. 137—622)

This invention relates to a valve. More particularly it relates to a slide valve for controlling optionally the admission and discharge of fluid pressure to and from a closed vessel.

It is an object of this invention to provide an improved valve of this character.

It is another object of this invention to provide a valve having a control member slidable on a cooperating valve seat with improved sealing means between the control member and the seat.

It is another object of this invention to provide such a valve wherein the necessity of grinding or other accurate finishing operations of the control member and seat is obviated.

It is another object of this invention to provide such a valve wherein cutting or wear of the control member and seat incident to use and resulting in a leaky valve is prevented.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Figure 2:
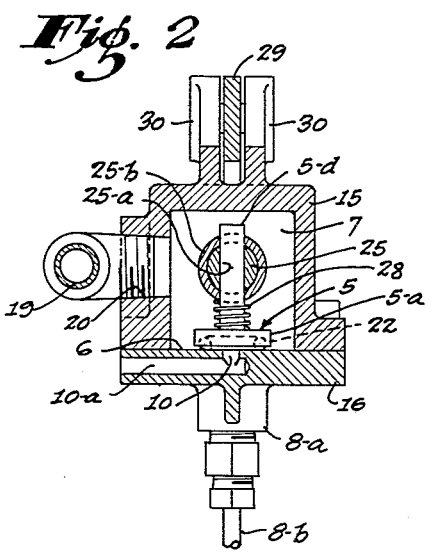
Figure 3:
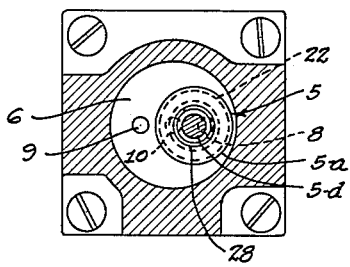

Referring to the drawings:

Figure 1 is a longitudinal section through a valve incorporating the features of the invention; and Figs. 2 and 3 are sections, taken as indicated by the lines correspondingly numbered on Fig. 1.

The valve is of that type sometimes referred to as a D valve, wherein a control member 5, slidable between limiting positions in sealed relation on a seat 6 within a closed pressure chamber 7, serves to control optionally a pair of ports 8 and 9. In one position, one port, as 8, is connected with an exhaust passage 10, while the other port 9 is in communication with the interior of the chamber 7. In the other position, the port 9 is connected with the exhaust 10, while port 8 is open into the chamber.

Such a valve may be employed for various purposes. For example, it can be used to control the movement of a piston 11 reciprocable within a cylinder 12, the piston 11 being appropriately connected to an element, not shown, the position of which it is desired to adjust.

The valve comprises a cup-shaped body member 15, having a cover or closure member 16 on which the valve seat 6 is formed, to provide the closed space or chamber 7. The chamber 7 is arranged to be connected with a suitable source of fluid pressure, as by a conduit 19 connected to a threaded opening 20 in the body 15. The valve seat 6 has a plane surface through which the ports 8, 9, and 10 open, the exhaust port 10 being intermediate the ports 8 and 9 and having a suitable outlet 10-a. The ports 8 and 9 communicate with the tapped bosses 8-a and 9-a respectively, into which are threadedly secured the conduits 8-b and 9-b leading to the opposite ends of the cylinder 12.

The control member 5 comprises a circular head 5-a with means therein cooperating with the seat 6 to form a circular chamber 5-c for establishing communication between either of the ports 8 and 9 and the exhaust port 10. The head 5-a also has a stem 5-d for guiding and positioning the control member 5. The arrangement is such that the member 5 is urged to seal against the valve seat 6 by the pressure in chamber 7 acting on the exterior of the member. To prevent leakage from the chamber 7 to any of the ports, the member 5 is sealed against the seat 6 by a ring of resilient, readily deformable material 22 confined between the head 5-a and the seat 6 by a groove 5-b of annular or loop configuration formed in the lower surface of the head 5-a. Neoprene has been found to be a suitable material for the sealing ring 22, although other forms of synthetic rubber may also be suitable. The use of such a sealing ring is very important. It can conform to the seat 6 in spite of minor wear of the sealing ring or of the seat. There is no tendency to aggravate any minor surface inaccuracy of the seat which, in prior art devices, would soon render the device unusable.

The means for moving the member 5 to control the piston 11 comprises an operating rod 25 supported for axial movement in the body 15 in a direction parallel with the seat, as by a boss 15-a on one side of the body 15, and an opening 15-b on the opposite side, and through which the rod 25 extends. The opening 15-b is provided with suitable packing 26. The stem 5-d extends slidably through an opening 25-a in the rod 25, so that the valve member 5 is free to seat in response to pressure in the chamber 7, although, at the same time, the member 5 is moved transversely on the seat by axial movement of the rod 25. The rod 25 is provided with a sleeve 25-b through which the stem 5-d passes and which serves, by engagement of its ends respectively with the opposite inside surfaces of the body 15, to limit the movement of the rod 25 and the control member 5.

The operating rod 25 may be actuated in any convenient manner. As illustrated, it is biased to the position shown by the pressure in the chamber 7. Furthermore, a light compression spring 27, accommodated in the boss 15-a, is provided for urging the control member 5 to this position in the event no fluid pressure is present in the chamber 7. Similarly, a light compression spring 28 is confined between the head 5-a of the member 5 and the sleeve 25 for maintaining the member on the seat 16. A bell crank 29 is pivotally supported on the body 15 by spaced ears 30, and is arranged to be operated by a push rod 31 to move rod 25 against the biasing force and position the control member 5 to admit pressure to the port 8 and connect the port 9 with the exhaust port.

By providing the resilient ring 22 for sealing between the control member 5 and its seat 6, the difficulty of preventing leakage between them is avoided, and it is not necessary to provide accurately matching contacting surfaces between them, finished as by grinding the control member in the seat. Further, the resilient ring prevents cutting or wear of the seat 6 by movement of the control member 6 thereon, even though adequate lubrication be lacking.

The inventor claims:

1. In a valve: means forming a valve body adapted to be supplied with fluid under pressure and having a valve seat with ports opening therethrough into the body; an operating rod spaced from said seat and supported for axial movement in a direction substantially parallel with said seat; a control member for cooperating with said seat, said control member including a stem extending normally of said seat, as well as a valve member having provisions for sealing against said seat, for controlling the ports; said rod providing a guide for said stem; said stem being slidable in said guide in a direction substantially normal to said seat, whereby the pressure of said body urges the valve member to seat, movement of said rod moving said control member transversely of said ports; and spring means between said rod and said control member urging said valve member toward said seat.

2. In a valve: means forming a valve body adapted to be supplied with fluid under pressure and having a valve seat with ports opening therethrough into the body; an operating rod spaced from said seat and extending out of the body and supported for axial movement in a direction substantially parallel with said seat; a stop sleeve on said rod within said body; a control member for co-operating with said seat to control the ports and having a stem extending normally of said seat and through said rod and sleeve for moving the member slidably along said seat by the rod, said stem being slidable in the rod in a direction normal to said valve seat and sleeve, whereby the pressure in said body urges the valve member to seat; and spring means between said rod and member urging said member toward said seat.

3. In a control valve: means forming a valve body, said body having a chamber adapted to be supplied with fluid under pressure, said body having a valve seat in the chamber, said seat having a plurality of ports opening into the chamber; an operating rod spaced from said seat and supported for axial movement in a direction substantially parallel to said seat; a control member having a face opposed to the seat for cooperating with said seat to control the ports, said control member having a stem extending substantially normally of said seat, said rod providing a guide for said stem, said stem being slidable in said guide in a direction substantially normal to said valve seat, movement of said rod moving said member transversely of said ports, said control member having a groove of looped configuration in its face; a resilient non-metallic sealing element partly disposed in said groove to retain said element against displacement with respect to said face, and having a part extending beyond the face and in continuous contact with said seat to define a space with said face and the valve seat; said member in one position thereby serving to establish communication between at least a pair of said ports; the fluid pressure in said chamber urging said valve member toward said seat and urging said sealing element into seating relationship with said groove; and spring means between said rod and said member, urging said member toward said seat.

References Cited in the file of this patent

UNITED STATES PATENTS

| | | |
|---|---|---|
| 331,789 | Harvey | Dec. 8, 1885 |
| 880,127 | Cramer | Feb. 25, 1908 |
| 1,083,006 | DeWein | Dec. 30, 1913 |
| 1,169,666 | Mayer | Jan. 25, 1916 |
| 1,582,450 | Chester | Apr. 27, 1926 |
| 1,790,168 | Paul | Jan. 27, 1931 |
| 1,855,913 | Hueber | Apr. 26, 1932 |
| 2,388,268 | Kromhout | Nov. 6, 1945 |
| 2,388,560 | Mead | Nov. 6, 1945 |
| 2,401,377 | Smith | June 4, 1946 |

FOREIGN PATENTS

| | | |
|---|---|---|
| 113,675 | Great Britain | 1918 |
| 495,456 | France | June 3, 1919 |